(12) United States Patent
Williams, III

(10) Patent No.: US 6,326,945 B1
(45) Date of Patent: Dec. 4, 2001

(54) MAGNETIC WRITING BOARD

(76) Inventor: Carl K. Williams, III, 1208 Nighthawk La., Knoxville, TN (US) 37923

(*) Notice: Subject to any disclaimer, the term of this patent is extended or adjusted under 35 U.S.C. 154(b) by 0 days.

(21) Appl. No.: 09/459,423

(22) Filed: Dec. 13, 1999

(51) Int. Cl.$^7$ ..................................................... G09G 3/00
(52) U.S. Cl. ............................................. 345/111; 40/449
(58) Field of Search ................................. 345/111, 169, 345/214, 84; 40/449; 340/815.62; 178/18

(56) References Cited

U.S. PATENT DOCUMENTS

| | | | |
|---|---|---|---|
| Re. 33,936 | 5/1992 | Miyamori et al. | 178/18 |
| 3,518,664 | 6/1970 | Taylor . | |
| 3,540,038 | 11/1970 | Taylor et al. . | |
| 4,417,241 | 11/1983 | Wakatake | 340/815.09 |
| 4,566,003 | 1/1986 | Wakatake . | |
| 5,475,939 | 12/1995 | Salam | 40/449 |
| 5,627,562 | 5/1997 | Skodlar | 345/111 |
| 5,642,130 | 6/1997 | Browne | 345/11 |
| 5,654,529 | 8/1997 | Yeung et al. | 178/18 |
| 5,717,515 | 2/1998 | Sheridon | 359/296 |
| 5,737,115 | 4/1998 | Mackinlay et al. | 359/623 |
| 5,818,414 | 10/1998 | Jaki et al. | 40/449 |
| 5,894,367 | 4/1999 | Sheridon | 359/296 |
| 5,898,418 | 4/1999 | Kao | 345/111 |

*Primary Examiner*—Amare Mengistu
(74) *Attorney, Agent, or Firm*—Pitts & Brittian, P.C.

(57) ABSTRACT

A magnetic writing board providing a thin, lightweight, durable writing board, which has an internal array of closely arranged magnet assemblies. The magnetic writing board is operated to contemporaneously create a display which may be transferred to a computer for the modification thereof. The image may then be redisplayed, printed, stored, and/or remotely displayed such as at a computer monitor. A portion or all of an image may be completely and immediately erased. The magnetic writing board includes a grid disposed behind a display surface and a plurality of display elements, one each disposed within each cell defined by the grid. Each grid cell receives a masking agent to obscure the contrasting color of at least the forward edge of the display element when the display element is in the back position. The magnet assemblies are each oriented with their magnetic poles in the same direction, with the positive and negative poles being oriented to face either the front or back of the magnetic writing board. A writing and erasing implement includes a pair of oppositely disposed magnets, one being disposed at each end. The writing end of the implement has a magnetic pole opposite to the forward facing pole of the magnet assemblies, causing the magnet assemblies directly in front of the writing end of the implement to be attracted toward the display surface.

12 Claims, 3 Drawing Sheets

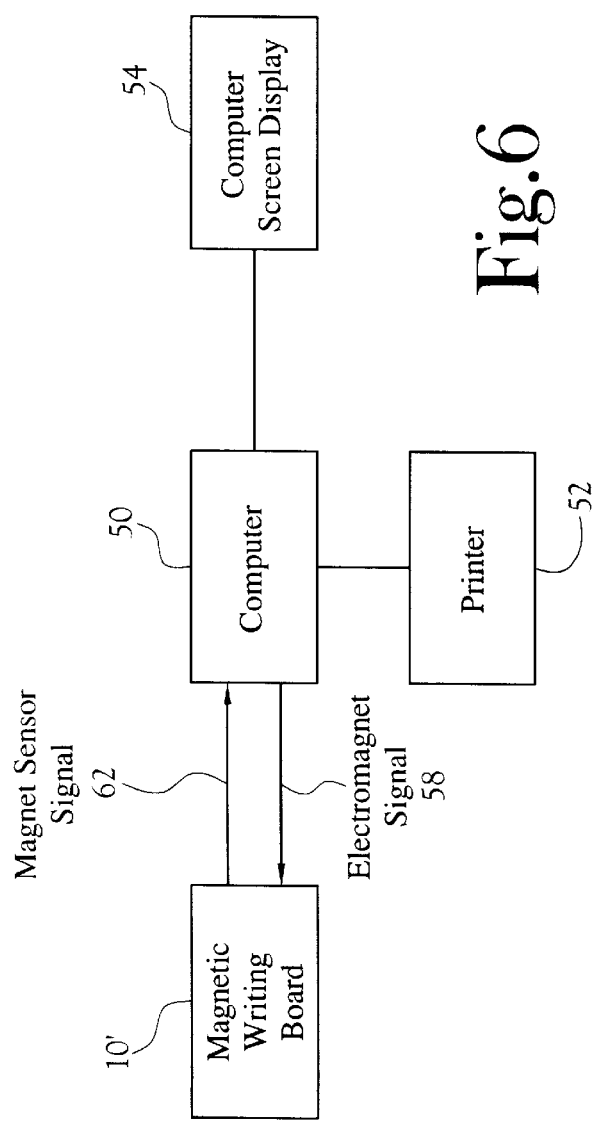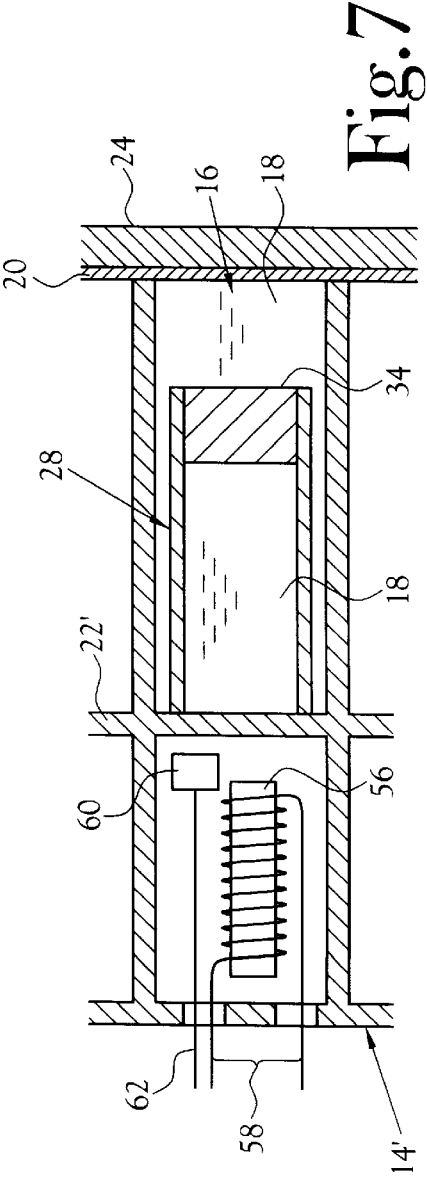

MAGNETIC WRITING BOARD

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention relates to a writing display board. More specifically, the present invention is related to a writing board having a display area defined by a matrix of reversible magnets held in a parallel position to each other with the same magnetic orientation. The magnets are driven and repelled by more powerful magnets to either write or erase by moving a contrasting surface into or out of the observer's view.

2. Description of the Related Art

Display boards having magnetically reversible elements are known in the art. Such display boards are typically used as display signs and advertisements. The display boards of the prior art provide a large matrix of magnetically reversible elements which are not practically usefull as replacements for a conventional chalkboard, dry erase board, or other similar type of display board. In addition, such display boards are relatively complex and expensive.

Typical of the art are those devices disclosed in the following U.S. Patent Nos.:

| U.S. Pat. No. | Inventor(s) | Issue Date |
| --- | --- | --- |
| 3,518,664 | M. K. Taylor | June 30, 1970 |
| 3,540,038 | M. K. Taylor et al. | Nov. 10, 1970 |
| 4,417,241 | M. Wakatake | Nov. 22, 1983 |
| 4,566,003 | M. Wakatake | Jan. 21, 1986 |
| Re. 33,936 | N. Miyamori et al. | May 26, 1992 |
| 5,475,939 | H. P. A. Salam | Dec. 19, 1995 |
| 5,627,562 | R. Skodlar | May 6, 1997 |
| 5,642,130. | J. Browne | June 24, 1997 |
| 5,654,529 | C. W. Yeung et a1. | Aug. 5, 1997 |
| 5,717,515 | N. K Sheridon | Feb. 10, 1998 |
| 5,737,115 | J. D. Mackinlay et al. | Apr. 7, 1998 |
| 5,818,414 | L. Jaki et al. | Oct. 6, 1998 |
| 5,894,367 | N. K. Sheridon | Apr. 13, 1999 |
| 5,898,418 | P. C. Kao | Apr. 27, 1999 |
| 5,901,483 | V. S. Tijanic | May 11,1999 |

Of these patents, the '664 patent issued to Taylor discloses a magnetically actuable visual display surface having a magnetically biased matrix of elements. Each element is rotatable about an axis upon the application of a magnetic field. The magnetic field is reversible in order to return the element back to its original state. A subset of the elements is provided to define a region in which may be displayed a single pre-defined character comprised of a plurality of the elements.

The '038 patent issued to Taylor et al. discloses a similar device in which each magnetically actuable element includes a plurality of display surfaces, each displaying a unique color. Two rotatable elements cooperate to define four display surfaces. The two elements are independently and magnetically controlled in order to selectively display any one of the four colors. As in the previous device, each element is controlled in a predetermined pattern.

Wakatake ('241) discloses a magnetically operated matrix display panel that is comprised of a matrix of electromagnetically rotatable elements. Each element defines four display surfaces. Two erasing heads are slidably disposed behind the matrix of rotatable elements, the erasing heads being vertically slidable behind the display elements for re-orienting the elements to their initial orientation to "erase" the displayed image or message.

Wakatake ('003) also discloses a rotatable display board comprised of a cylindrical matrix of elements, a column of writing magnetic heads and a column of erasing magnetic heads. As the display board is rotated, the column of writing magnetic heads is electrically operated to selectively orient a corresponding column of display elements to a selected orientation. As the display board completes a rotation, the column of erasing magnetic heads returns each display element to its original orientation.

Reissue patent 33,936 issued to Miyamori et al. discloses an electronic blackboard apparatus. A conventional writing surface is provided with a writing instrument having a magnetic core, an eraser having a magnetic core, and a position-detecting control unit. As a user writes on the display surface, the position-detecting control unit detects the position of the writing implement relative to the blackboard. Position data is then stored, electronically displayed on a remote display screen, and/or printed onto a printable medium. While Miyamori et al. disclose a means for electronically storing data representing an image written on a blackboard, they do not disclose a display which is magnetically operable. Inherent problems associated with the use of a blackboard are likewise associated with the '936 device. Specifically, the '936 device requires consumable writing implements and cleaning the writing medium such as chalk and ink.

Skodlar ('562) discloses a magnetic display used as a label in applications such as a price tag for goods, a due date and/or time for movie rentals and library books, and the like. The label includes a display area with magnetic particles which can be oriented by an external magnetic field in the shape of a readable image. A portable writing apparatus includes an electrically controllable writing magnet and an electrically controllable erase magnet. The writing apparatus is placed proximate the display area of the label and the selected text is entered on a keyboard carried by the writing apparatus. The entered data are then processed and the write and/or erase magnets are electrically actuated to orient the magnetic particles within the display area of the label. Skodlar does not, however, disclose a device for randomly actuating the individual magnetic particles to form handwritten or drawn image.

Browne ('130) discloses a display array and power control circuit similar to that of the Taylor devices described above. Browne further discloses the use of a Hall effect switch to control each of the magnetically actuated elements. A light source is also disclosed to augment the appearance of an individual element when oriented in a selected viewing orientation.

Salam ('939) also discloses a matrix display device which incorporates an illumination source. In the '939 device, the illumination source is an array of back-lit diffusers to correspond with the array of rotatable reflective vanes which are carried on a removable display sheet.

Yeung et al. ('529) disclose a handheld computing device having a planar display and a superimposed, transparent digitizer. A passive stylus is used to press on and move across the surface of the display in order to simulate writing or drawing. As the stylus is so moved, a line is produced directly under the path of the stylus. An inductive winding under the display surface is provided for inducing a small voltage under the path of a magnet disposed on one end of the stylus in order to erase a selected portion of the display. The images drawn on the display are digitized and stored as collected data for further use such as remote display, future retrieval and display, or for printing.

The '515 and '367 devices disclosed by Sheridon and the '115 device disclosed by Mackinlay et al. are electrode assemblies for an addressable light-modulating apparatus, wherein the light-modulating apparatus is a gyricon made up of electrically and optically anisotropic spheroidal balls rotatably disposed in a substrate. Each spheroidal ball is bounded by four edges, each edge being electrically connected to an electrode assembly such that a discrete electrical potential is applicable to each edge in order to orient the ball in four selected orientations. The orientation of each of the balls is controlled electrically.

Jaki et al. ('414) disclose a single display device having passive components for displaying characters consisting of a plurality of matrix-arranged picture elements. Each display element is constructed of a generally cylindrical body mounted to swivel about its centroidal axis. An operating coil is provided behind each display element for applying a magnetic field to the element for rotating the same.

The device disclosed by Kao ('418) is a magnetically operated display element. The element includes a frame of one color and a pivotally mounted plate having a first side of the same color as the frame and a second side of a second color. A ferromagnetic element is carried by the frame to cooperate with a,magnetic member carried by the plate to accomplish pivoting of the plate. An LED is associated with the device and is illuminated when the plate is pivoted to reveal the second side thereof, thereby illuminating only those elements that comprise the selected text and or images. The device disclosed by Tijanic ('483) is similar to the '418 device. Both of these devices are electrically operated for displaying pre-determined text messages or images.

Other devices similar to those discussed above are known in the art. While these devices teach the use of magnetically-actuated image display elements, none discloses a writing unit having magnetically-actuated image elements which allow for selective writing and erasure, as well as marking either directly by a person holding a writing and erasure apparatus, inputting into a computer and transferring to the writing surface, using a combination of both input options, or transferring images from the writing board to a computer. Further, the prior art fails to teach a writing board having magnetically-actuated display elements wherein text and images displayed on the board surface remain until the writer desires to erase. Each of the prior art devices requires electric power to operate each display element, and fails to teach a means for generating a display comprised of magnetically-actuated elements without the requirement of electrical power.

Therefore, it is an object of the present invention to provide a writing board including a matrix of magnetically-actuated display elements each controlled by a magnetic writing implement.

Another object of the present invention is to provide such a writing board wherein each magnetically-actuated display element defines a size such that the density of the matrix is sufficient to enable the writing board to be used as a suitable replacement of a chalk board or dry erase board.

It is also an object of the present invention to provide such a writing board wherein each display element is electrically controllable to display a pre-selected display, and to store data corresponding to a display generated on the display screen using the magnetic writing implement.

A further object of the present invention is to provide a writing board having magnetically-actuated display elements whereby selected portions or all of the magnetically-actuated display elements are immediately actuable to "erase" portions or all of a display.

As such, it is an object of the present invention to provide such a writing board wherein electrical power is required only for the display of a pre-selected display and for downloading and storing data corresponding to an image, and wherein no electrical power is required for the generation of a display image using the magnetic writing implement.

Due to the use of magnetic display elements, it is also an object of the present invention to provide a writing board devoid of residue resulting from conventional writing boards such as chalk and marker boards.

It is also an object of the present invention to provide a writing board which is comprised of simple mechanical movements having relatively few parts susceptible to failure.

Other objects and advantages over the prior art will become apparent to those skilled in the art upon reading the detailed description together with the drawings as described as follows.

BRIEF SUMMARY OF THE INVENTION

The simplest version of this invention provides a thin, lightweight, durable writing board, which has an internal array of very small, closely arranged magnet assemblies separated by a grid assembly, made of a light weight material, such as plastic. The magnetic writing board is operated to contemporaneously create a display which, in one embodiment, may also be transferred to a personal computer by use of a conventional software program, allowing for the modification thereof. The image, whether modified or not, may be redisplayed on the writing board, printed, stored for future retrieval, and/or remotely displayed such as at a computer monitor, or any other display device. Moreover, stored images may also be displayed. The magnetic writing board including the communication with a computer is capable of complete and immediate erasure of a portion or all of the displayed image. The power consumption of the magnetic writing board is limited to that required for the display of a pre-selected or modified display and for downloading and storing data corresponding to an image. As a result of the magnetic display, residue resulting from conventional writing boards such as chalk and marker boards is eliminated. Further, the limited number of mechanical parts reduces the risk of failure of the magnetic writing board.

The magnetic writing board includes a grid disposed behind a display surface. A frame is provided to bound the display area of the magnetic writing board. The magnetic writing board is composed of a plurality of display elements disposed in a matrix configuration as defined by the grid, with one display element being disposed within each cell defined by the grid. Each grid cell is filled with a white, viscous liquid to obscure the contrasting color (such as black) of at least the forward edge of the display element when the display element is in the back position.

Each display element includes a magnet assembly, the forward end of which defines the aforementioned contrasting color. A magnet is placed inside the forward end of an aluminum tube. At least the forward edge of the magnet assembly is of a color contrasting to the surrounding array. It is envisioned that more than one magnet may be disposed within the tube, and that the magnet may be disposed at locations other than the forward end thereof in order to effectively cooperate with various arrangements of electromagnets and magnetic sensors associated with various embodiments of the present invention.

The display surface of the magnetic writing board is defined by a continuous surface which is preferably smooth, clear, and scratch resistant. Suitable surfaces are fabricated from glass, hard plastic or the like. A sealing membrane fabricated preferably from a thin plastic polyethylene sheet is disposed under the display surface and is secured to the forward portion of the grid in order to seal the individual cells thereof The back wall of the magnetic writing board is formed as an integral part of the plastic injection molded grid. The magnet assemblies are each oriented with their magnetic poles in the same direction, with the positive and negative poles being oriented to face either the front or back of the magnetic writing board.

A writing and erasing implement includes a pair of oppositely disposed magnets, one being disposed at each end. Relative to each other, the magnets are disposed in the same polar direction such that a first end of the implement has a positive polarity while the second end has a negative polarity. The writing end of the implement has an exterior magnetic pole opposite to the forward facing pole of the magnet assemblies, causing the magnet assemblies directly in front of the writing end of the implement to be attracted toward the display surface of the magnetic writing board. The erasing end has an exterior magnetic polarity the same as the forward facing pole of the magnet assemblies, thus causing the magnet assemblies directly in front of the erasing end of the implement to be repelled away from the display surface of the magnetic writing board. A dedicated erasing device defines a planar configuration to enable quick erasure of a large area. The erasing device incorporates a sheet magnet having the polarity as described above, with the exterior magnetic polarity matching the polarity of the display surface of the magnet assemblies.

An electronic adaptation of the present invention allows for created images to be sent to and from the magnetic writing board and computer, as desired. The electronic adaptation of the present invention is accomplished by the use of electromagnets and magnet proximity sensors placed directly behind each grid position. The electromagnets are used to communicate the desired position of the magnet assembly within its grid cell. Transmission of information from the magnetic writing board to the computer is accomplished by the magnet sensors. Each magnet sensor detects the strength of the electrical field induced by the magnet assembly with which it is associated. A signal strength beyond a set level indicates a close proximity of the magnet assembly and the signal to the computer equates to an "OFF" position for that grid cell. A signal strength of a level below a set strength is caused by the magnet assembly being in the forward or "ON" position, indicating to transmit an "ON" signal to the computer, or to place a mark on the computer screen for this position. The complete matrix of "ON" and "OFF" signals can be transferred to a personal computer to be modified, redisplayed, stored as an image for future retrieval, printed for distribution, or displayed on a remote display. Software associated with the storage of the image may also be equipped with alphabetic character recognition for enhancing the editing of the image retrieved from the magnetic writing board, and specifically for translating the image into a selected font and font size.

BRIEF DESCRIPTION OF THE SEVERAL VIEWS OF THE DRAWINGS

The above-mentioned features of the invention will become more clearly understood from the following detailed description of the invention read together with the drawings in which:

FIG. 6 is a schematic illustration of an electronic adaptation of the magnetic writing board of the present invention; and FIG. 7 is a side view, in section, of an electronic adaptation of the magnetic writing board of the present invention.

DETAILED DESCRIPTION OF THE INVENTION

A magnetic writing board incorporating various features of the present invention is illustrated generally at 10 in the figures. The magnetic writing board 10, provides a writing board including a matrix of magnetically-actuated display elements 26 each controlled by a magnetic writing and erasing implement 36. The magnetic writing board 10 is operated to contemporaneously create a display which, in one embodiment, may also be transferred to a personal computer by use of a conventional software program, allowing for the modification thereof. The image, whether modified or not, may be redisplayed on the writing board, printed, stored for future retrieval and/or remotely displayed such as at a computer monitor, or any other display device. Moreover, stored images may also be displayed. The magnetic writing board 10 including the communication with a computer is capable of complete and immediate erasure of a portion or all of the displayed image. The power consumption of the magnetic writing board 10 is limited to that required for the display of a pre-selected display and for downloading and storing data corresponding to an image. As a result of the magnetic display, residue resulting from conventional writing boards such as chalk and marker boards is eliminated. Further, the limited number of mechanical parts reduces the risk of failure of the magnetic writing board 10.

Figure 1:
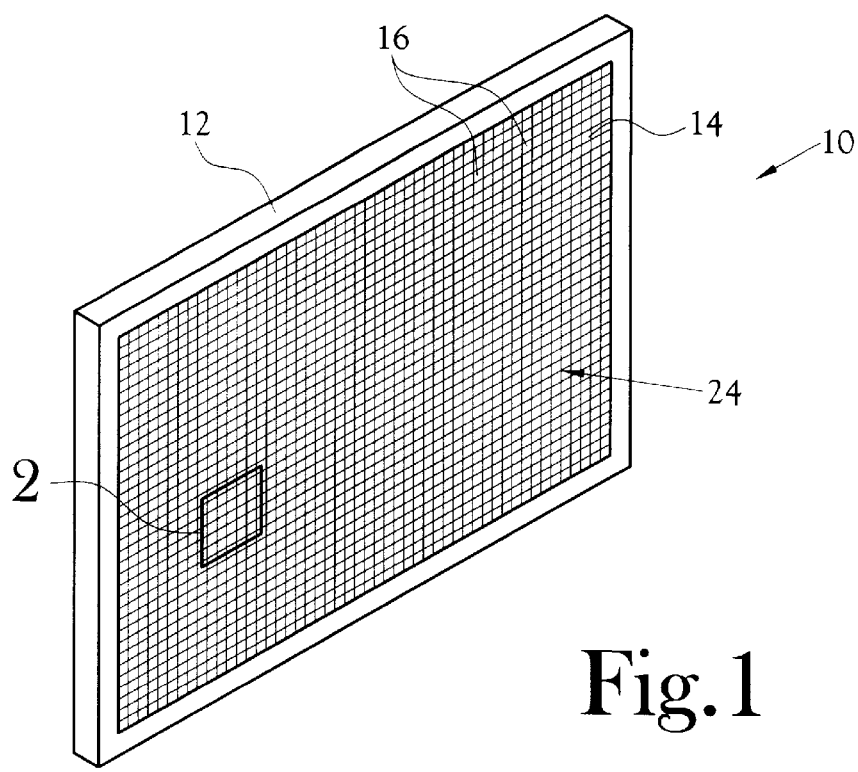
FIG. 1 is a perspective view of the magnetic writing board of the present invention.
Figure 2:
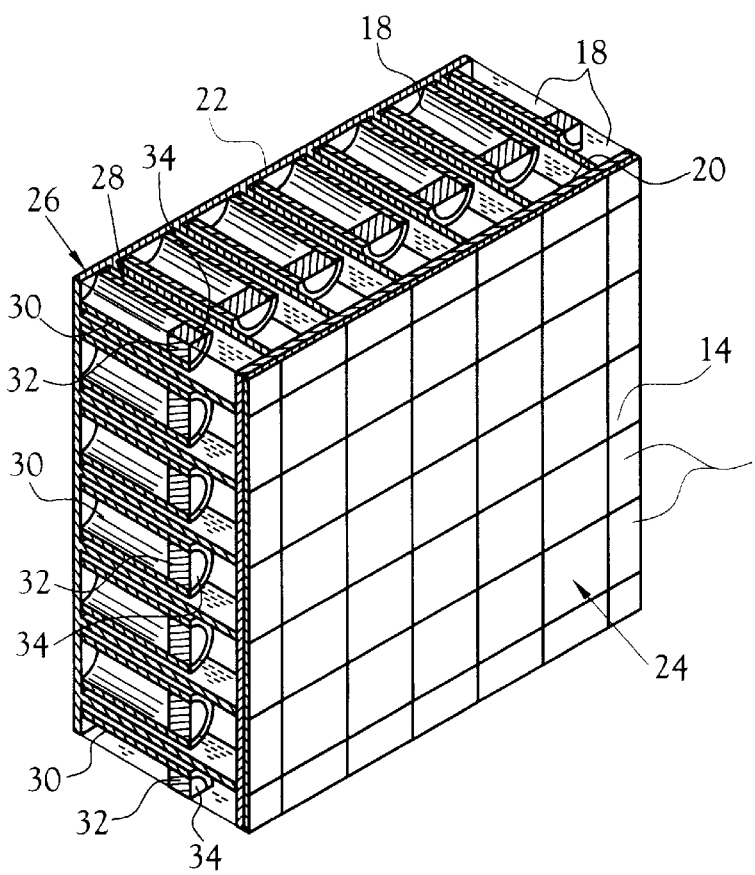
FIG. 2 is an enlarged perspective view of a portion of the magnetic writing board as illustrated at 2 in FIG. 1.

FIG. 1 is a perspective view of the magnetic writing board 10 with the grid 14 disposed on a display screen 24 being emphasized. The grid 14, though clearly visible in the illustration, is in actuality only subtly visible and is illustrated herein for purposes of clarity of the invention. A frame 12 is provided to bound the display area 24 of the magnetic writing board 10. FIG. 2 more clearly illustrates a portion of the magnetic writing board 10 of FIG. 1. The magnetic writing board 10 is composed of a plurality of display elements 26 disposed in a matrix configuration as defined by the grid 14, with one display element 26 being disposed within each cell 16 defined by the grid 14. Each display element 26 includes a magnet assembly 28 and a masking agent such as the fluid 18 illustrated and described herein.

The grid 14 blends with the open areas of the grid 14 by either being the same color as the open areas or by being clear. In the preferred embodiment, the grid 14 is made of plastic by injection molding and is clear.

Figure 3:
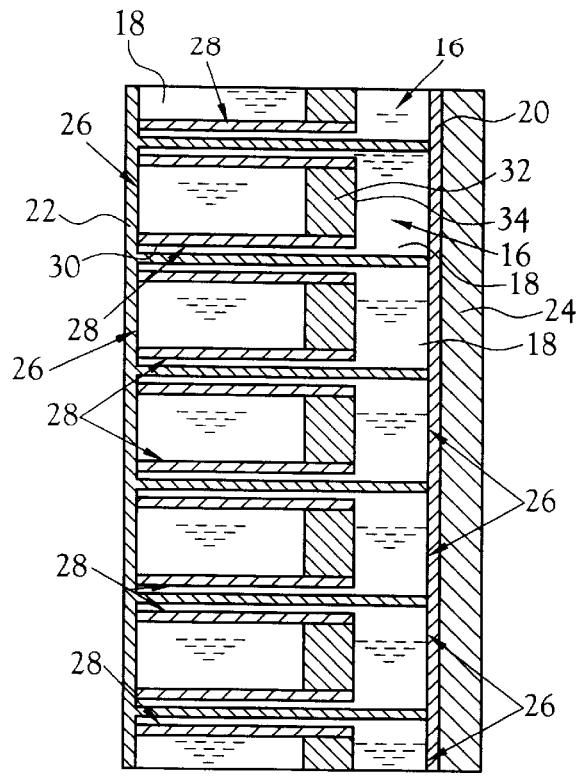
FIG. 3 is a side view of the enlarged portion of the magnetic writing board as illustrated in FIG. 2.

FIG. 3 is a side view of the portion of the magnetic writing board 10 shown in FIG. 2 which illustrates a plurality of display elements 26 in cross-section. As illustrated therein, each display element 26 includes a magnet assembly 28, the forward end 34, or display surface, of which defines the aforementioned contrasting color. For purposes of description of the present invention, the term "forward" herein is used to describe that portion of the invention disposed toward the display screen 24. In this embodiment, a magnet 32 is placed inside the forward end of an aluminum tube 30. At least the forward end 34 of the magnet assembly 28 is of a color contrasting to the surrounding array. The magnet 32 of the illustrated embodiment is fabricated from a material of contrasting color. Alternatively, although not shown, an element of contrasting color may be applied to the forward end 34 such as by painting or gluing. Aluminum is the preferred material of construction as it is paramagnetic, lightweight, and rigid. However, it will be understood that other materials are useful, and therefore, the present invention is not limited to the use of aluminum Further, it will be understood that while an aluminum magnet tube 30 is illustrated, the magnets 32 may be free-floating in a linear direction toward and away from the display screen 24 within the respective grid cells 16 without the need for a magnet tube 30. While being allowed to float in a linear direction toward and away from the display screen 24, the magnets 32 are prevented from reorienting their magnetic poles as constrained by the configuration of the individual grid cells 16. However, it is beneficial to reduce the size of the magnets 32 to minimize the grid 14 matrix. In one embodiment, the grid 14 consists of approximately sixty-four (64) magnets 32 per square inch. However, the present invention is not limited to this resolution.

As illustrated in FIG. 3, a masking agent is provided within each grid cell 16. In the illustrated embodiment, the masking agent in each grid cell 16 is a white, viscous liquid 18 to obscure the contrasting color (such as black) of at least the forward end 34 of the magnet assembly 28 when the magnet assembly 28 is in the back position. Although not illustrated, this could readily be accomplished by other methods, such as by having the magnet 32 rotate an object that has contrasting colors on either side, such that as the magnet 32 moves forward, the device rotates to show the contrasting color. In addition, this can also be accomplished by having the magnet assembly 28 actuate a shutter type device, doors, or similar device (not shown). In either embodiment, whether the masking agent is a viscous liquid 18 or a mechanical device, the masking agent is displaced to reveal the magnet assembly forward end 34 as the magnet assembly 28 is moved toward the display screen 24.

The display screen 24 of the magnetic writing board 10 is defined by a continuous surface which is preferably smooth, clear, and scratch resistant. Suitable surfaces are fabricated from glass, hard plastic or the like. In the illustrated embodiment in which the masking agent is a viscous liquid 18, a sealing membrane 20 fabricated preferably from a thin plastic polyethylene sheet is disposed under the display screen 24 and is secured to the forward portion of the grid 14 in order to seal the individual cells 16 thereof. In those alternate embodiments wherein the masking agent is a mechanical device, there is no need for a sealing member 20. In the preferred embodiment, the sealing membrane 20 is heat adhered to the grid to prevent leakage of the liquid 18 disposed therein. The back wall 22 of the magnetic writing board 10 is formed as an integral part of the plastic injection molded grid 14. The magnet assemblies 28 are each oriented with their magnetic poles in the same direction, with the positive and negative poles being oriented to face either the front or back of the magnetic writing board 10.

Figure 4:
FIG. 4 is a cross-section of a writing and erasing implement used in association with the magnetic writing board of the present invention.

FIG. 4 is an illustration, in section, of a writing and erasing implement 36. The implement 36 includes a pair of oppositely disposed magnets 40,44, one being disposed at each end 38,42. Relative to each other, the magnets 40,44 are disposed in the same polar direction. Effectively, then, a first end 38 of the implement 36 has a positive polarity while the second end 42 has a negative polarity. The writing end of the implement 36 has an exterior magnetic pole opposite to the forward facing pole of the magnet assemblies 28, causing the magnet assemblies 28 directly in front of the writing end of the implement 36 to be attracted toward the display screen 24 of the magnetic writing board 10. The erasing end has an exterior magnetic polarity the same as the forward facing pole of the magnet assemblies 28, thus causing the magnet assemblies 28 directly in front of the erasing end of the implement 36 to be repelled away from the display screen 24 of the magnetic writing board 10. The implement 36 is configured to define any of various sizes to enable differing widths of writing strokes or erasure of detailed areas or larger areas, with ease.

Figure 5:
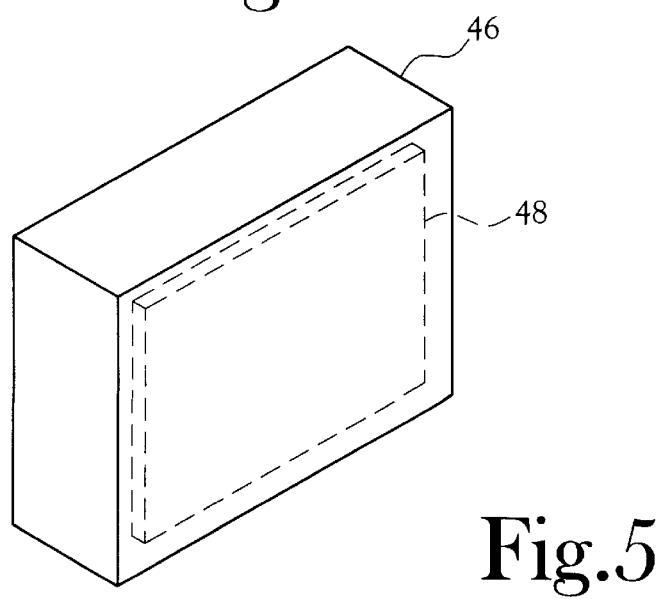
FIG. 5 is a perspective view of a dedicated erasing device used in association with the magnetic writing board of the present invention.

A dedicated erasing device 46 is illustrated in FIG. 5. The erasing device 46 of this embodiment defines a planar configuration to enable quick erasure of a large area. The erasing device 46 incorporates a sheet magnet 48 having the polarity as described above, with the exterior magnetic polarity matching the polarity of the display surface 34 of the magnet assemblies 28.

FIG. 6 is a schematic illustration of an electronic adaptation of the present invention. In this alternate embodiment, created images are sent to and from the magnetic writing board 10' and a computer 50, as desired. Specifically, after an image has been created on the display screen of the magnetic writing board 10' by passage of the writing and erasing implement 36 (FIG. 4) in close proximity thereto, digitized data is generated and stored such that the image may be recalled in the future. For images that have been stored previously, such stored images may be recalled on the display screen 24 (FIG. 7) as desired. Images that have been contemporaneously created or previously created and stored are printable via a printer 52. Such images are likewise capable of being modified by software programs run by the personal computer to which the images are downloaded, the modified images then being displayable on the magnetic writing board 10', printed, stored, or remotely displayed such as at computer screen display 54. Foreseeable software programs currently available include graphics editors, alphanumeric character recognition software, and the like.

As shown in FIG. 7, the electronic adaptation of the present invention is accomplished by the use of electromagnets 56 and magnet proximity sensors 60 placed directly behind each grid cell 16. The electromagnets 56 are used to communicate the desired position of the magnet assembly 28 within its grid cell 16. Specifically, the electromagnet 56 is controlled to position the magnet assembly 28 in its grid cell 16 either forward or rearward relative to the display screen 24. This is accomplished by the computer 50 signaling an "ON" or "OFF" signal 58 to each electromagnet 56 at each position within the grid 14. An "ON" signal 58 actuates the electromagnet 56 to repel the associated magnet assembly 28 forward such that the display surface 34 of the magnet assembly 28 is viewable, while the "OFF" signal 58 causes the magnet assembly 28 to be attracted to or remain toward the rear of its grid cell 16. The "ON/OFF" signal 58 then provides electricity flow to each electromagnet 56 in a direction that causes it to transmit either a positive or negative electromagnetic pulse directed toward the magnet assembly 28 as appropriate. This either repels or attracts each magnet assembly 28 as desired, causing the display screen 24 of the magnetic writing board 10' to represent the stored image.

Transmission of information from the magnetic writing board 10' to the computer 50 is accomplished by the magnet proximity sensors 60. Each magnet proximity sensor 60 detects the strength of the electrical field induced by the magnet assembly 28 with which it is associated. A signal strength beyond a set level indicates a close proximity of the magnet assembly 28 and the signal 62 to the computer 50 equates to an "OFF" position for that grid cell. A signal strength of a level below a set strength is caused by the magnet assembly 28 being in the forward or "ON" position, indicating to transmit an "ON" signal 62 to the computer, or to place a mark on the computer screen for this position. The complete matrix of "ON" and "OFF" signals 62 is stored as a stored image for future retrieval, printed for distribution, or displayed on a remote display such as at a computer monitor, or any other display device.

From the foregoing description, it will be recognized by those skilled in the art that a magnetic writing board offering advantages over the prior art has been provided. Specifically, the magnetic writing board provides a writing board including a matrix of magnetically-actuated display elements each controlled by a magnetic writing implement. The magnetic elements and the grid within which they are disposed are each configured such that the magnets are prevented from reorienting. Further, because they are disposed relatively closely to the display surface, the magnets are low-powered, thus reducing interaction between adjacent magnets. As a result, each magnetically-actuated display element defines a size such that the density of the matrix is sufficient to enable the writing board to be used as a suitable replacement of a chalk board or dry erase board. The magnetic writing board is operated to contemporaneously create a display which, in one embodiment, may also be transferred to a personal computer by use of a conventional software program, allowing for the modification thereof The image, whether modified or not, may be redisplayed on the writing board, printed, stored for future retrieval, and/or remotely displayed such as at a computer monitor, or any other display device. Moreover, stored images may also be displayed. The magnetic writing board including the communication with a computer is capable of complete and immediate erasure of a portion or all of the displayed image. The power consumption of the magnetic writing board is limited to that required for the display of a pre-selected display and for downloading and storing data corresponding to an image.

While a preferred embodiment has been shown and described, it will be understood that it is not intended to limit the disclosure, but rather it is intended to cover all modifications and alternate methods falling within the spirit and the scope of the invention as defined in the appended claims.

I claim:

1. A magnetic writing board apparatus comprising:
    a non-magnetic grid matrix defining a plurality of grid cells;
    a display screen positioned over said non-magnetic grid matrix;
    a plurality of magnet assemblies, one each of said plurality of magnet assemblies being slidably received within one each of said plurality of grid cells, each of said plurality of magnet assemblies being oriented in a common polarity, each of said plurality of magnet assemblies defining a display surface disposed to be visible through said display screen when said magnet assembly is moved to a forward position proximate said display screen;
    a masking agent disposed within each of said grid cells for masking said display surface of each of said plurality of magnet assemblies, said masking agent defining a color contrasting a color defined by said display face of each of said plurality of magnet assemblies, said masking agent being displaced when one of said plurality of magnet assemblies is moved toward said display screen, thus effecting a color change visible through said display screen;
    a writing implement emitting a magnetic field of a polarity opposite said common polarity of said plurality of magnet assemblies such that as said writing implement is passed over said display screen, proximate of said plurality of magnet assemblies are attracted toward said display screen and said display surface of each of said proximate magnet assemblies is made visible; and
    an erasing implement emitting a magnetic field of a polarity common to said common polarity of said plurality of magnet assemblies such that as said erasing implement is passed over said display screen, proximate of said plurality of magnet assemblies are repelled away from said display screen and said display surface of each of said proximate magnet assemblies is made invisible.

2. The magnetic writing board of claim 1 wherein said writing implement and said erasing implement are unitary in construction to define a writing/erasing implement, said writing implement being disposed at a first end of said writing/erasing implement and said erasing implement being disposed at a second end of said writing/erasing implement.

3. The magnetic writing board of claim 1 wherein said erasing implement defines a plate-type configuration to accommodate quick erasure of large areas, said erasing implement including a sheet-type magnet disposed proximate an erasing surface defined by said erasing implement.

4. The magnetic writing board of claim 1 further comprising:
    a plurality of electromagnets, one each being disposed behind each of said plurality of magnet assemblies; and
    a controller for controlling a current applied to each of said plurality of electromagnets to transmit one of a positive magnetic pole and a negative magnetic pole to each of said plurality of magnet assemblies to repel selected of said plurality of magnet assemblies toward said display screen and to attract a remaining of said plurality of magnet assemblies away from said display screen to effectuate display of a stored image.

5. The magnetic writing board of claim 1 further comprising:
    a plurality of magnet proximity sensors, one each being disposed behind each of said plurality of magnet assemblies, each of said plurality of magnet proximity sensors detecting a magnetic field strength associated with a corresponding of said plurality of magnet assemblies, said magnetic field strength being indicative of a position of said corresponding magnet assembly with respect to said display screen; and
    a processor for processing said magnetic field strength detected for each of said plurality of magnet assemblies, a compilation of said magnetic field strength for each of said plurality of magnet assemblies being useful for transferring an image to a data storage and processing device for at least modification, re-displaying, printing, storing and remotely displaying said image displayed concurrently on said image display.

6. The magnetic writing board of claim 1 wherein said masking agent is a viscous liquid in which each of said plurality of magnet assemblies freely floats in a linear direction toward and away from said display screen within each said grid cell, reorientation of each of said plurality of magnet assemblies being prevented by each of said plurality of grid cells.

7. A magnetic writing board apparatus comprising:

a non-magnetic grid matrix defining a plurality of grid cells;

a display screen positioned over said non-magnetic grid matrix;

a plurality of magnet assemblies, one each of said plurality of magnetic assemblies being sidably received within one each of said plurality of grid cells, each of said plurality of magnet assemblies being oriented in a common polarity, each of said plurality of magnet assemblies defining a display surface disposed to be visible through said display screen when said magnet assembly is moved to a forward position proximate said display screen;

a masking agent disposed within each of said grid cells for masking said display surface of each of said plurality of magnet assemblies, said masking agent defining a color contrasting a color defined by said display face of each of said plurality of magnet assemblies, said masking agent being displaced when one of said plurality of magnet assemblies is moved toward said display screen, thus effecting a color change visible through said display screen, said masking agent being a viscous liquid in which each of said plurality of magnet assemblies freely floats in a linear direction toward and away from said display screen within each said grid cell, reorientation of each of said plurality of magnet assemblies being prevented by each of said plurality of grid cells; and a writing and erasing implement defining a first end and a second end, a writing implement being disposed at said first end and emitting a magnetic field of a polarity opposite said common polarity of said plurality of magnet assemblies such that as said writing implement is passed over said display screen, proximate of said plurality of magnet assemblies are attracted toward said display screen and said display surface of each of said proximate magnet assemblies is made visible, and an erasing implement being disposed at said second end and emitting a magnetic field of a polarity common to said common polarity of said plurality of magnet assemblies such that as said erasing implement is passed over said display screen, proximate of said plurality of magnet assemblies are repelled away from said display screen and said display surface of each of said proximate magnet assemblies is made invisible.

8. The magnetic writing board of claim 7 further comprising a second erasing implement defining a plate-type configuration to accommodate quick erasure of large areas, said erasing implement including a sheet-type magnet disposed proximate an erasing surface defined by said erasing implement.

9. The magnetic writing board of claim 7 further comprising:

a plurality of electromagnets, one each being disposed behind each of said plurality of magnet assemblies; and a controller for controlling a current applied to each of said plurality of electromagnets to transmit one of a positive magnetic pole and a negative magnetic pole to each of said plurality of magnet assemblies to repel selected of said plurality of magnet assemblies toward said display screen and to attract a remaining of said plurality of magnet assemblies away from said display screen to effectuate display of a stored image.

10. The magnetic writing board of claim 7 further comprising:

a plurality of magnet proximity sensors, one each being disposed behind each of said plurality of magnet assemblies, each of said plurality of magnet proximity sensors detecting a magnetic field strength associated with a corresponding of said plurality of magnet assemblies, said magnetic field strength being indicative of a position of said corresponding magnet assembly with respect to said display screen; and a processor for processing said magnetic field strength detected for each of said plurality of magnet assemblies, a compilation of said magnetic field strength for each of said plurality of magnet assemblies being useful for transferring an image to a data storage and processing device for at least modification, re-displaying, printing, storing and remotely displaying said image displayed concurrently on said image display.

11. A magnetic writing board apparatus comprising:

a non-magnetic grid matrix defining a plurality of grid cells;

a display screen positioned over said non-magnetic grid matrix;

a plurality of magnet assemblies, one each of said plurality of magnetic assemblies being slidably received within one each of said plurality of grid cells, each of said plurality of magnet assemblies being oriented in a common polarity, each of said plurality of magnet assemblies defining a display surface disposed to be visible through said display screen when said magnet assembly is moved to a forward position proximate said display screen;

a masking agent disposed within each of said grid cells for masking said display surface of each of said plurality of magnet assemblies, said masking agent defining a color contrasting a color defined by said display face of each of said plurality of magnet assemblies, said masking agent being displaced when one of said plurality of magnet assemblies is moved toward said display screen, thus effecting a color change visible through said display screen, said masking agent being a viscous liquid in which each of said plurality of magnet assemblies freely floats in a linear direction toward and away from said display screen within each said grid cell, reorientation of each of said plurality of magnet assemblies being prevented by each of said plurality of grid cells;

a writing and erasing implement defining a first end and a second end, a writing implement being disposed at said first end and emitting a magnetic field of a polarity opposite said common polarity of said plurality of magnet assemblies such that as said writing implement is passed over said display screen, proximate of said plurality of magnet assemblies are attracted toward said display screen and said display surface of each of said proximate magnet assemblies is made visible, and an erasing implement being disposed at said second end and emitting a magnetic field of a polarity common to said common polarity of said plurality of magnet assemblies such that as said erasing implement is passed over said display screen, proximate of said plurality of magnet assemblies are repelled away from said display screen and said display surface of each of said proximate magnet assemblies is made invisible;

a plurality of electromagnets, one each being disposed behind each of said plurality of magnet assemblies;

a controller for controlling a current applied to each of said plurality of electromagnets to transmit one of a positive magnetic pole and a negative magnetic pole to each of said plurality of magnet assemblies to repel selected of said plurality of magnet assemblies toward said display screen and to attract a remaining of said plurality of magnet assemblies away from said display screen to effectuate display of a stored image;

a plurality of magnet proximity sensors, one each being disposed behind each of said plurality of magnet assemblies, each of said plurality of magnet proximity sensors detecting a magnetic field strength associated with a corresponding of said plurality of magnet assemblies, said magnetic field strength being indicative of a position of said corresponding magnet assembly with respect to said display screen; and a processor for processing said magnetic field strength detected for each of said plurality of magnet assemblies, a compilation of said magnetic field strength for each of said plurality of magnet assemblies being useful for transferring an image to a data storage and processing device for at least modification, re-displaying, printing, storing and remotely displaying said image displayed concurrently on said image display.

12. The magnetic writing board of claim 11 further comprising a second erasing implement defining a plate-type configuration to accommodate quick erasure of large areas, said erasing implement including a sheet-type magnet disposed proximate an erasing surface defined by said erasing implement.

* * * * *